US009058839B1

(12) United States Patent
Corriveau

(10) Patent No.: US 9,058,839 B1
(45) Date of Patent: Jun. 16, 2015

(54) SECURE ONLINE PICTURES

(71) Applicant: Telefonaktiebolaget L M Ericsson (Publ), Stockholm (SE)

(72) Inventor: Brian Corriveau, Vancouver (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/109,371

(22) Filed: Dec. 17, 2013

(51) Int. Cl.
*G06F 21/00* (2013.01)
*G11B 20/00* (2006.01)

(52) U.S. Cl.
CPC ...... *G11B 20/00659* (2013.01); *G11B 20/0021* (2013.01)

(58) Field of Classification Search
CPC ...................... G11B 20/00659; G11B 20/0021
See application file for complete search history.

(56) References Cited

U.S. PATENT DOCUMENTS

| 6,748,415 | B1 * | 6/2004 | Sugimoto | 709/201 |
|---|---|---|---|---|
| 2004/0189646 | A1 * | 9/2004 | Hayashi et al. | 345/473 |
| 2006/0029252 | A1 | 2/2006 | So | |
| 2007/0076868 | A1 * | 4/2007 | Ming | 380/54 |
| 2012/0109784 | A1 * | 5/2012 | Marion | 705/27.1 |

FOREIGN PATENT DOCUMENTS

| EP | 2 270 591 A1 | 1/2011 |
|---|---|---|
| EP | 2 541 891 A1 | 1/2013 |
| JP | 2003-264816 | 9/2003 |

OTHER PUBLICATIONS

Steffan (Jan. 25, 2011). German developers release digital eraser software. *Sci-Tech*. Retrieved from: http://www.dw.de/german-developers-release-digital-eraser-software/a-14786968.
Myce.com (Jan. 27, 2011). New Web image format includes DRM, allowing photo expiration. Myce.com. Retrieved from: http://www.myce.com/news/new-web-image-format-includes-drm-allowing-photo-expiration-39226/.
Chua, et al.: "Yovo Photo-Sharing App Messes Up Screenshots to Protect Your Pics OhGizmo!" Oct. 17, 2014. http://www.ohgjzmo.com/2014/10/17ivovo-photo-sharing-app-messes-screenshots:protect-pics/.

* cited by examiner

*Primary Examiner* — Jeffrey Pwu
*Assistant Examiner* — William Corum, Jr.

(57) ABSTRACT

A secure picture generating device and corresponding method are described herein for receiving a picture and then generating a secure picture executable file which functions to secure the picture when it is posted to an online social media site or elsewhere on the Internet. In addition, a secure picture displaying device (which has a display or is connected to one or more remote displays) and corresponding method are described herein for receiving a secure picture executable file and then executing the secure picture executable file to display a selected portion of the picture at any one time on the display/remote display in a manner wherein the picture is perceivable by the human eye on the display/remote display but an image copy of the display/remote display at any given time will not capture the entire picture.

20 Claims, 5 Drawing Sheets

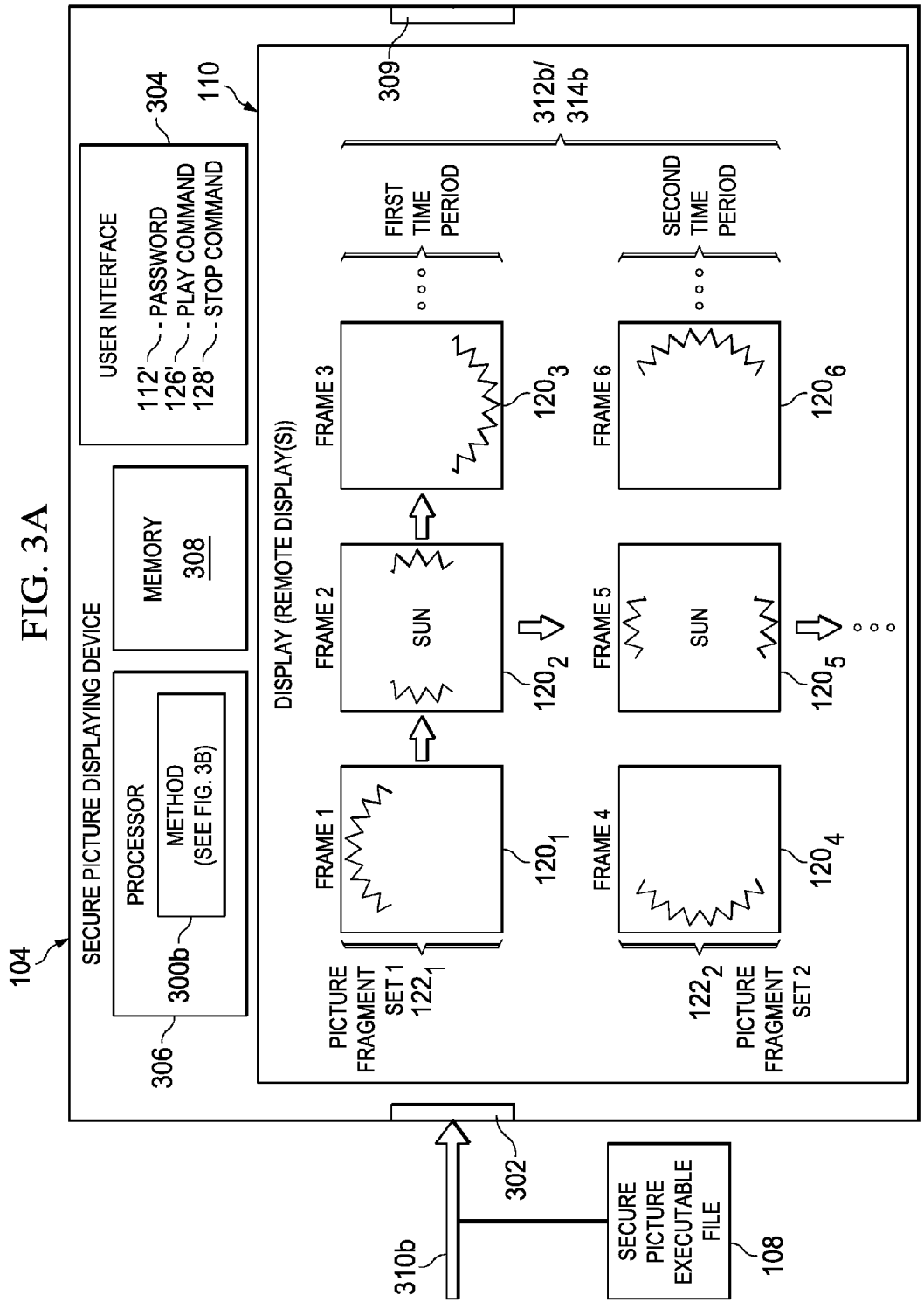

SECURE ONLINE PICTURES

TECHNICAL FIELD

The present invention relates to a secure picture generating device, a secure picture displaying device and various methods which are used for securing a picture so it cannot be copied by a browser function or a screen snap shot when the picture is posted to an online social media site or elsewhere on the Internet.

BACKGROUND

Currently there are very few security methods that can be used to protect pictures let alone protect pictures which are posted to an online social media site or elsewhere on the Internet. For example, people may store their pictures in encrypted files, but generally when their pictures are posted to the online social media site or elsewhere on the Internet then their pictures are open to copying through a browser function or a screen snap shot. Thus, even if a posted picture is subsequently taken off the Internet it could have already been copied by anyone while it was posted on the Internet. Consequently, there is a need to address this problem and other problems so that a picture cannot be copied by a browser function or a screen snap shot while the picture is posted to an online social media site or elsewhere on the Internet.

SUMMARY

A secure picture generating device, a secure picture displaying device and various methods which address the aforementioned problem and other problems are described in the independent claims of the present application. Advantageous embodiments of the secure picture generating device, the secure picture displaying device and the various methods have been described in the dependent claims of the present application.

In one aspect, the present invention comprises a secure picture generating device for securing a picture. The secure picture generating device comprises a processor and a memory that stores processor-executable instructions where the processor interfaces with the memory and executes the processor-executable instructions to enable a receiving operation, a segmenting operation, a creating operation, and an outputting operation. In the receiving operation, the secure picture generating device receives the picture. In the segmenting operation, the secure picture generating device segments the picture into a plurality of picture frames. In the creating operation, the secure picture generating device creates a plurality of picture fragment sets, wherein each picture fragment set comprises picture frames selected from the plurality of picture frames and the selected picture frames when taken together collectively represent the picture. In the generating operation, the secure picture generating device generates a secure picture executable file which comprises the plurality of picture fragment sets and animation code. The animation code comprises playing instructions for playing the plurality of picture fragment sets in sequence one after another, wherein each picture fragment set would be played such that the selected picture frames are individually displayed one after another in a repeatable manner during a predetermined time period. In the outputting operation, the secure picture generating device outputs the secure picture executable file. The secure picture generating device has an advantage in that it generates a secure picture executable file which secures a picture so it cannot be copied by a browser function or a screen snap shot when the picture is posted to an online social media site or elsewhere on the Internet.

In another aspect, the present invention comprises a method implemented by a picture generating device for securing a picture. The method comprises a receiving operation, a segmenting operation, a creating operation, and an outputting operation. In the receiving operation, the secure picture generating device receives the picture. In the segmenting operation, the secure picture generating device segments the picture into a plurality of picture frames. In the creating operation, the secure picture generating device creates a plurality of picture fragment sets, wherein each picture fragment set comprises picture frames selected from the plurality of picture frames and the selected picture frames when taken together collectively represent the picture. In the generating operation, the secure picture generating device generates a secure picture executable file which comprises the plurality of picture fragment sets and animation code. The animation code comprises playing instructions for playing the plurality of picture fragment sets in sequence one after another, wherein each picture fragment set would be played such that the selected picture frames are individually displayed one after another in a repeatable manner during a predetermined time period. In the outputting operation, the secure picture generating device outputs the secure picture executable file. The method has an advantage in that it generates a secure picture executable file which secures a picture so it cannot be copied by a browser function or a screen snap shot when the picture is posted to an online social media site or elsewhere on the Internet.

In another aspect, the present invention comprises a secure picture displaying device for securing a picture. The secure picture displaying device comprises a processor and a memory that stores processor-executable instructions where the processor interfaces with the memory and executes the processor-executable instructions to enable a receiving operation, and an executing operation. In the receiving operation, the secure picture displaying device receives a secure picture executable file which comprises: (1) a plurality of picture fragment sets, wherein each picture fragment set comprises picture frames selected from a plurality of picture frames, whereby each picture frame is a segment of the picture, and whereby the selected picture frames when taken together collectively represent the picture; and (2) animation code comprising playing instructions for playing the plurality of picture fragment sets in sequence one after another, wherein each picture fragment set would be played such that the selected picture frames are individually displayed one after another in a repeatable manner during a predetermined time period. In the executing operation, the secure picture displaying device executes the playing instructions whereby the picture is perceivable on a display but an image copy of the display at any given time will capture the displayed selected picture frame but will not capture the picture. The secure picture displaying device has an advantage in that it displays the picture such that the picture cannot be copied by a browser function or a screen snap shot.

In still another aspect, the present invention comprises a method implemented by a secure picture displaying device for securing a picture. The method comprises a receiving operation, and an executing operation. In the receiving operation, the secure picture displaying device receives a secure picture executable file which comprises: (1) a plurality of picture fragment sets, wherein each picture fragment set comprises picture frames selected from a plurality of picture frames, whereby each picture frame is a segment of the picture, and whereby the selected picture frames when taken together collectively represent the picture; and (2) animation code comprising playing instructions for playing the plurality of picture fragment sets in sequence one after another, wherein each picture fragment set would be played such that the selected picture frames are individually displayed one after another in a repeatable manner during a predetermined time period. In the executing operation, the secure picture displaying device executes the playing instructions whereby the picture is perceivable on a display but an image copy of the display at any given time will capture the displayed selected picture frame but will not capture the picture. The method has an advantage in that causes the secure picture displaying device to display the picture such that the picture cannot be copied by a browser function or a screen snap shot.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 3A-3B respectively illustrate a diagram of the secure picture displaying device and a flowchart of a method implemented by the secure picture displaying device for displaying the picture in a secure manner in accordance with an embodiment of the present invention.

DETAILED DESCRIPTION

Figure 1:
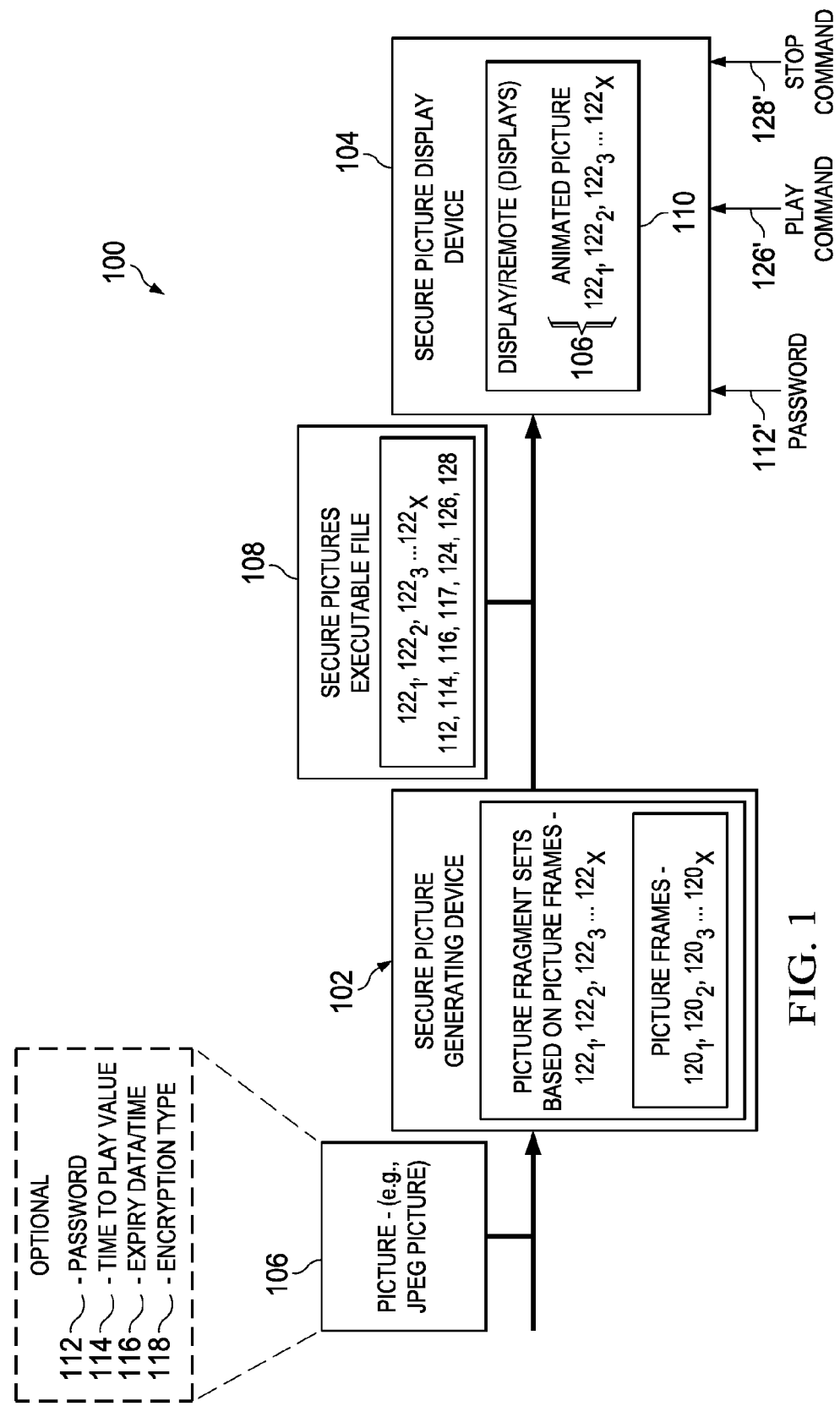
FIG. 1 is a basic diagram of a secure picture system which comprises a picture generating device and a secure picture displaying device in accordance with an embodiment of the present invention.

Referring to FIG. 1, there is illustrated a basic diagram of a secure picture system 100 comprising a secure picture generating device 102 and a secure picture displaying device 104 which are configured in accordance with an embodiment of the present invention. Basically, the secure picture generating device 102 operates to receive a picture 106 (e.g., Graphics Interchange Format (GIF) picture 106, a Joint Photographic Experts Group (JPEG) picture 106 or any other standard picture format) and then generate and output a secure picture executable file 108. The secure picture displaying device 104 (which has a display 110 and/or is connected to remote display(s) 110) operates to receive the secure picture executable file 108 and then execute the secure picture executable file 108 to display only a selected portion of the picture 106 at any one time on the display 110/remote display(s) 110 such that the entire picture 106 is perceivable by the human eye but an image copy of the display 110/remote display(s) 110 by a browser function or a screen snap shot at any given time will capture the displayed selected portion of the picture 106 but will not capture the entire picture 106. It should be appreciated that the secure displaying device 104 can have a display 110 but this is not required instead the secure displaying device 104 may be connected via Internet, wireless connections etc. ... to one or more remote display(s) 110.

A general discussion describing the secure picture generating device 102, the secure picture executable file 108, and the secure picture displaying device 104 is provided next and then a more detailed discussion describing the secure picture generating device 102, the secure picture executable file 108, and the secure picture displaying device 104 is provided with respect to FIGS. 2A, 2B, 3A and 3B to explain the different technical features and the advantages associated with the present invention.

The Secure Picture Generating Device 102

The secure picture generating device 102 receives a picture 106 in the form of a GIF file, a JPEG file or some other standard picture format. The secure picture generating device 102 may also receive an optional password 112, an optional time to play value 114 (in any time value such as days, hours, minutes or seconds), an optional expiry date and time value 116, and an optional encryption type 118.

The secure picture generating device 102 segments the picture 106 into a number of picture frames $120_1$, $120_2$, $120_3$ ... $120_x$ and creates a number of picture fragment sets $122_1$, $122_2$, $122_3$ ... $122_x$. Each picture fragment set $122_1$, $122_2$, $122_3$ ... $122_x$ is composed of a certain number of picture frames (two or more) which were selected from the set of picture frames $120_1$, $120_2$, $120_3$ ... $120_x$ (three or more). In particular, each picture fragment set $122_1$, $122_2$, $122_3$ ... $122_x$ holds a certain number of selected picture frames $120_1$, $120_2$, $120_3$ ... $120_x$ (two or more). And, each picture fragment set $122_1$, $122_2$, $122_3$ ... $122_x$ has their own selected set of picture frames which when taken together compose the entire picture 106. Typically, each picture fragment set $122_1$, $122_2$, $122_3$ ... $122_x$ would have their own distinct set (different set) of selected picture frames $120_1$, $120_2$, $120_3$ ... $120_x$. Alternatively, the secure picture generating device 102 can create the picture fragment sets $122_1$, $122_2$, $122_3$ ... $122_x$ where for example one picture fragment set $122_1$ could be composed of x picture frames $120_1$, $120_2$, $120_3$ ... $120_x$ where each picture frame holds only every xth horizontal line from the original picture 106. In particular, a set of three picture frames $120_1$, $120_2$, $120_3$ with this kind of fragmentation would be such that the first frame $120_1$ would contain every $3^{rd}$ horizontal line starting from line one, the second frame $120_2$ would contain every $3^{rd}$ horizontal line starting from line two, and the third frame $120_3$ would contain every $3^{rd}$ horizontal line starting from line three. Then, the second set of picture fragments $122_2$ could contain x picture frames $120_1$, $120_2$, $120_3$ ... $120_x$ where each picture frame only holds every xth vertical line, from the original picture 106 and so on. One skilled in the art will appreciate that based on these teachings there are a wide variety of ways that the secure picture generating device 102 can create the picture fragment sets $122_1$, $122_2$, $122_3$ ... $122_x$ by using segmented picture frames $120_1$, $120_2$, $120_3$ ... $120_x$ from the original picture 106. It should be appreciated that the secure picture generating device 102 need not generate the segmented picture frames $120_1$, $120_2$, $120_3$ ... $120_x$ first and then generate the picture fragment sets $122_1$, $122_2$, $122_3$ ... $122_x$ from the previously generated picture frames $120_1$, $120_2$, $120_3$ ... $120_x$ but instead could create the picture fragment sets $122_1$, $122_2$, $122_3$ ... $122_x$ at same time segmenting picture frames $120_1$, $120_2$, $120_3$ ... $120_x$ from the original picture 106. In any case, the secure picture displaying device 104 as will be described in more detail below uses these picture fragment sets $122_1$, $122_2$, $122_3$ ... $122_x$ and in particular their selected picture frames $120_1$, $120_2$, $120_3$ ... $120_x$ to display (animate) the picture 106.

The secure picture generating device 102 stores and if desired can encrypt the picture fragment sets $122_1$, $122_2$, $122_3 \ldots 122_x$ and other data including the optional password 112, the optional time to play value 114, the optional expiry date and time value 116 within the secure picture executable file 108. Further, the secure picture generating device 102 adds animation code 124 (e.g. Application Programming Interface API animation code 124) and a decryption key 117 (if encryption is used) within the secure picture executable file 108. The animation code 124 and the decryption key 117 would typically not be encrypted. As will be described in more detail below, the secure picture displaying device 104 receives the secure picture executable file 108 and would first prompt the user to input a password 112' and check if the inputted password 112' matches the stored password 112 (this step assumes the optional password 112 is used). If the inputted password 112' matches the stored password 112, then the secure picture displaying device 104 would then utilize the decryption key 117 to decrypt the secure picture executable file 108 assuming encryption was used and then execute the animation code 124 to animate (display) the picture 106.

The Secure Picture Executable File 108

The secure picture executable file 108 contains the picture data and code data. The picture data is typically encrypted and comprises the picture fragment sets $122_1$, $122_2$, $122_3 \ldots 122_x$ and other data including the optional password 112, the optional time to play value 114, and the optional expiry date and time value 116. The code data is not typically encrypted and comprises the animation code 124 (e.g., API code 124) and the optional decryption key 117. The animation code 124 comprises code instructions (software) for displaying (animating) the picture 106 utilizing the picture fragment sets $122_1$, $122_2$, $122_3 \ldots 122_x$. Basically, the only way that the secure picture displaying device 104 can display (animate) the picture 106 utilizing the picture fragment sets $122_1$, $122_2$, $122_3 \ldots 122_x$ is through the animation code 124. Of course, if one had the decryption key 117 then they could decrypt the secure picture executable file 108 and have access to the picture 106 through the picture fragment sets $122_1$, $122_2$, $122_3 \ldots 122_x$. Typically, the secure picture generating device 102 would only generate the decryption key 117 if the optional encryption type 118 is received and utilized. Alternatively, the secure picture generating device 102 need not receive the encryption type 118 to use encryption instead the secure picture generating device 102 could automatically use encryption to protect to the secure picture executable file 108. In any case, the secure picture generating device 102 would in most circumstances use encryption so that the picture fragment sets $122_1$, $122_2$, $122_3 \ldots 122_x$ could not easily be extracted from the secure picture executable file 108.

The animation code 124 can be accessed through two non-blocking API calls: play and stop. The play call 126' (which activates the playing instructions 126) comprises a file handle, a window handle, a position, and the optional password 112. The secure picture executable file 108 is first verified and then locked while executing the playing instructions 126. If the play is called when for example a valid password 112' and play command 126' are received from a user of the secure picture displaying device 104 then the picture 106 is decrypted (assuming encryption was used) and animated in the display 110/remote display(s) 110 (recall: the requirement of the password 112 to start the playing instructions 126 is optional). The playing instructions 126 will repeatedly display the selected picture frames $120_1$, $120_2$ and $122_3$ (for example) from one picture fragment set $122_1$ (for example) over a predetermined time (e.g., one second) and then repeatedly display the selected picture frames $120_4$, $120_5$ and $120_6$ (for example) from another picture fragment set $122_2$ (for example) over a predetermined time (e.g., one second) and so on. If one attempted to copy the currently displayed picture 106 through a browser function or a screen snap shot then the resulting image copy would only contain the displayed selected picture frame $120_2$ (for example) and more importantly not contain the entire picture 106. The only way to display the picture data $120_1$, $120_2$, $120_3 \ldots 120_x$ is through the API playing instructions 126.

If the optional time to play value 114 is set, then the secure picture displaying device 104 decrements the time to play value 114 every second (or any desired time period), and writes back the corresponding updated time to play value 114 to the opened secure picture executable file 108. If the time to play value 114 reaches zero, or the optional expiry date and time value 116 is reached, then the picture fragment sets $122_1$, $122_2$, $122_3 \ldots 122_x$ and their corresponding picture frames $120_1$, $120_2$, $120_3 \ldots 120_x$ are cleared or otherwise deleted from the secure picture displaying device 104 and the secure picture executable file 108. If this happens, then the animation of the picture 106 stops. If for some reason, the opened secure picture executable file 108 cannot be updated with the corresponding updated time to play value 114 then the animation of the picture 106 stops.

The stop call 128' (which activates the stopping instructions 128) when activated for example by a user inputting a stop command 128' into the secure picture displaying device 104 would result in the stopping of the animation of the picture 106. In addition, the receipt of the stop call 128' (which activates the stopping instructions 128) results in the stopping of the decrementing of the time to play value 114. At this point in time, the secure picture executable file 108 would be closed and the secure picture 106 would not be displayed (animated).

The secure picture executable file 108 may be copied, but the optional password 112, the optional time to play value 114, and the optional expiry date and time value 116 will also be part of the copied secure picture executable file 108.

The Secure Picture Displaying Device 104

The secure picture displaying device 104 is configured to receive and store the secure picture executable file 108 into memory. The secure picture displaying device 104 is further configured to open a window to request the user to input a password 112' (if there is an optional password 112 within the secure picture executable file 108) and if the password requirement is satisfied and the user's presents a play command 126' then the secure picture 106 would be displayed (animated). Generally, the secure picture displaying device 104 can be made (e.g., instructed by user commands 126' and 128') to play or stop playing the secure picture 108. For instance, the secure picture displaying device 104 would prompt a user for a file path of the secure picture executable file 108, and request a password 112' which needs to be received and verified before being able to initiate the API playing instructions 126 which may also require the receipt of a play command 126' (from the user) in order to animate the secure picture 106. The API playing instructions 126 is called with the file handle of the secure picture executable file 108, the password 112', and a window handle for displaying the secure picture 106. If the user inputs a stop command 128', then the secure picture displaying device 104 would stop the display (animation) of the secure picture 106.

The secure picture displaying device 104 can be anyone of a wide variety of different types of devices that display a picture. For example, the secure picture displaying device 104 may be a computer such as smart phone, laptop, tablet etc. . . . that has a browser application that can receive and execute the secure picture executable file 108 in order to animate the picture 106. Alternatively, the secure picture displaying device 104 may be a simple device which has a single task application that would only be used for receiving and executing the secure picture executable file 108 to animate the picture 106. This simple device could be similar to a specialized application that only displays GIF or JPEG pictures and would not require the input of a password 112, play command 126' or stop command 128'. Alternatively, the secure picture generating device 102 and the secure picture displaying device 104 may be incorporated onto a user's computer, smart phone, laptop, tablet etc. such that the user may download/take a picture and then upload, post or otherwise display/animate the picture to an online social media site or elsewhere on the Internet.

Figure 2A:
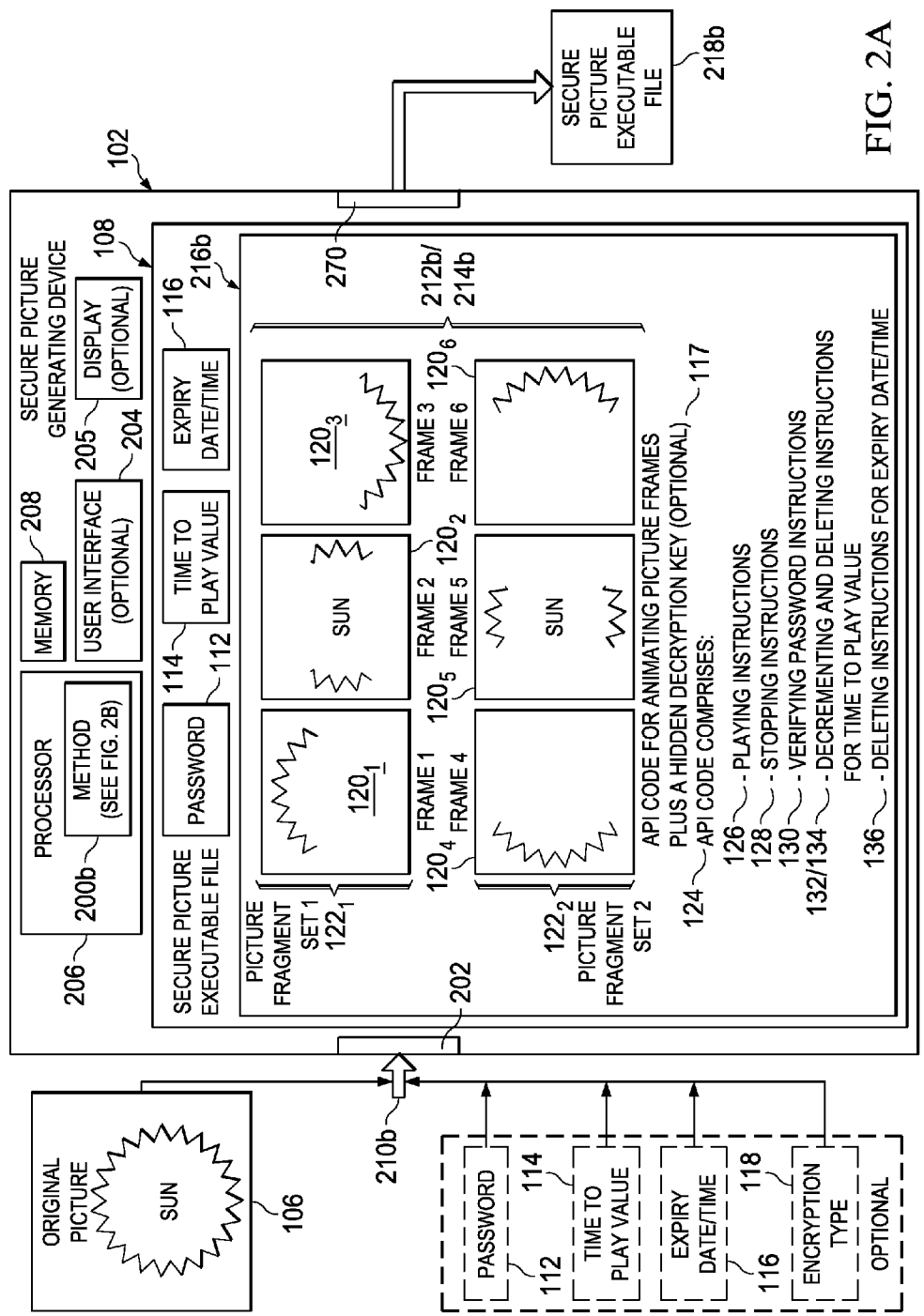
FIGS. 2A-2B respectively illustrate a diagram of the secure picture generating device and a flowchart of a method implemented by the secure picture generating device for securing a picture in accordance with an embodiment of the present invention.
Figure 2B:
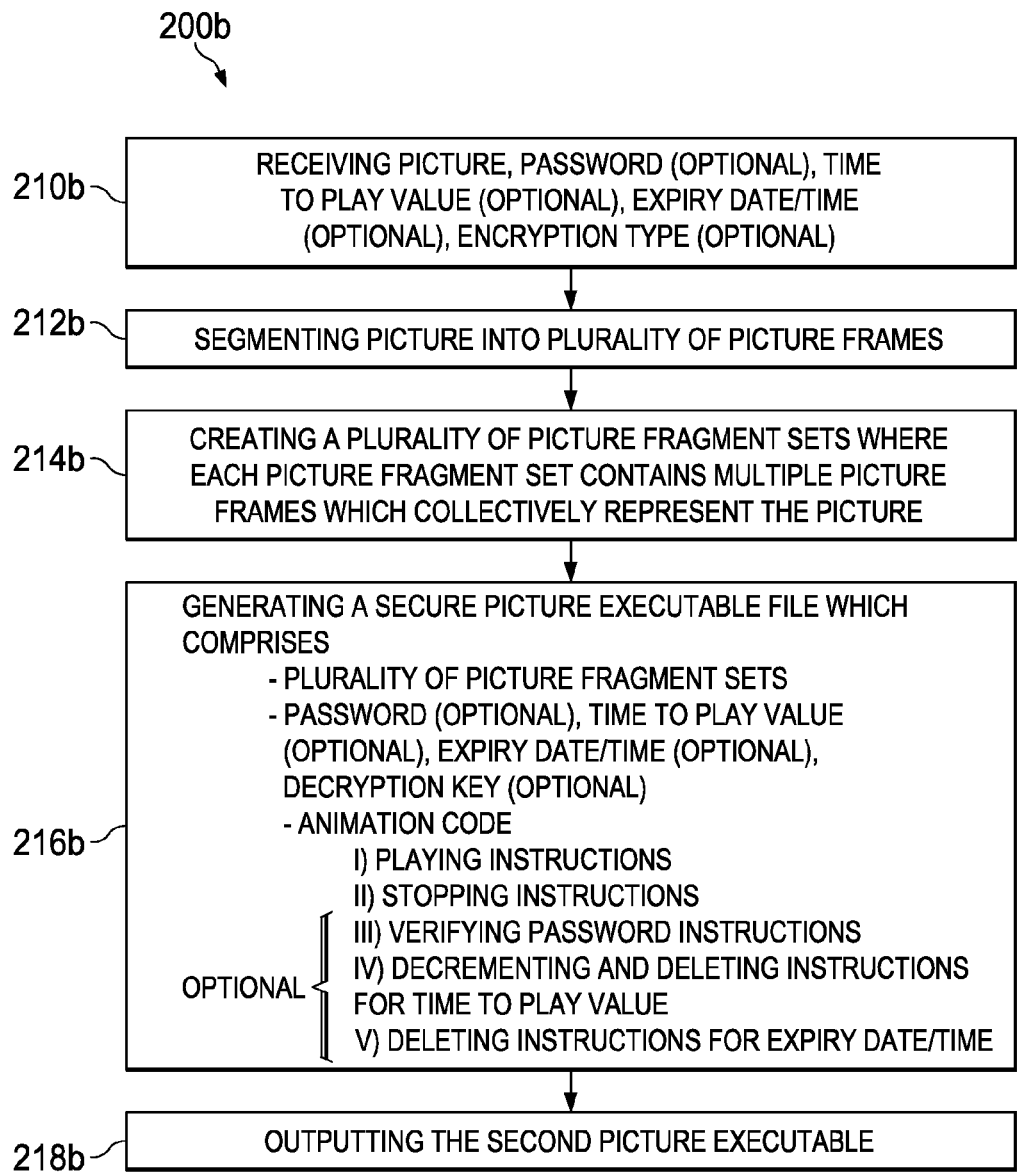

Referring to FIGS. 2A-2B, there are respectively illustrated a diagram of an exemplary secure picture generating device 102 and a flowchart of a method 200b implemented by the secure picture generating device 102 for securing a picture 106 in accordance with an embodiment of the present invention. As shown in FIG. 2A, the secure picture generating device 102 comprises an input interface 202, an optional user interface 204, an optional display 205, a processor 206, a memory 208, and an output interface 210. The secure picture generating device 102 may incorporate many other well-known components but for clarity only those components 202, 204, 205, 206, 208, and 210 which are needed to describe the features of the present invention are discussed and shown herein.

The secure picture generating device 102 comprises the processor 206 which interfaces with the memory 208 and executes processor-executable instructions stored therein to enable a receiving operation 210b, a segmenting operation 212b, a creating operation 214b, a generating operation 216b, and an outputting operation 218b (see FIG. 2B' method 200b).

In the receiving operation 210b, the secure picture generating device 102 receives via the input interface 202 the picture 106 in the form of a GIF file, a JPEG file or some other standard picture format. The secure picture generating device 102 may also receive via the input interface 202 one of more of the following: the optional password 112, the optional time to play value 114 (in any time value such as days, hours, minutes or seconds), the optional expiry date and time value 116, and the optional encryption type 118 (see FIG. 2B's receiving operation 210b).

In the segmenting operation 212b, the secure picture generating device 102 segments the picture 106 into a number of picture frames $120_1$, $120_2$, $120_3$ ... $120_x$. In the illustrated example, the secure picture generating device 102 segments the picture 106 of the "sun" into six picture frames $120_1$, $120_2$, $120_3$, $120_4$, $120_5$ and $120_6$ (see FIG. 2B's segmenting operation 212b). If desired, the secure picture generating device 102 could segment or otherwise divide the received picture 106 into many different picture frames such as 24 picture frames and each picture frame would represent ¹/₂₄th of the total picture 106. Alternatively, the secure picture generating device 102 could segment or otherwise divide the received picture 106 into individual picture frames which may have some overlapping parts of the picture 106. Further, the secure picture generating device's display 205 could show the picture 106 and the resulting segmented picture frames $120_1$, $120_2$, $120_3$ ... $120_x$ in the display 205.

In the creating operation 214b, the secure picture generating device 102 creates a number of picture fragment sets $122_1$, $122_2$, $122_3$ ... $122_x$. Each picture fragment set $122_1$, $122_2$, $122_3$ ... $122_x$ that is created is composed of a certain number of picture frames (two or more) which were selected from the set of picture frames $120_1$, $120_2$, $120_3$ ... $120_x$ (three or more). In particular, each picture fragment set $122_1$, $122_2$, $122_3$ ... $122_x$ holds a number of selected picture frames $120_1$, $120_2$, $120_3$ ... $120_x$ (two or more). And, each picture fragment set $122_1$, $122_2$, $122_3$ ... $122_x$ has their own selected set of picture frames which when taken together compose the entire picture 106. Typically, each picture fragment set $122_1$, $122_2$, $122_3$ ... $122_x$ would have their own distinct set of picture frames selected from the segmented picture frames $120_1$, $120_2$, $120_3$ ... $120_x$ (see FIG. 2B's creating operation 214b). In the illustrated example, the secure picture generating device 102 creates two picture fragment sets $122_1$ and $122_2$. The first picture fragment set $122_1$ comprises picture frames $120_1$, $120_2$ and $122_3$ which when taken (or combined) together compose the entire picture 106 (note: if desired the picture frames $120_1$, $120_2$ and $122_3$ could have overlapping parts of the picture 106). The second picture fragment set $122_2$ comprises picture frames $120_4$, $120_5$ and $122_6$ which when taken together (or combined) compose the entire picture 106 (note: if desired the picture frames $120_1$, $120_2$ and $122_3$ could have overlapping parts of the picture 106).

In the generating operation 216b, the secure picture generating device 102 generates the secure picture executable file 108 (see FIG. 2B's generating operation 216b). As shown, the secure picture executable file 108 comprises the plurality of picture fragment sets $122_1$, $122_2$, $122_3$ ... $122_x$, the optional password 112, the optional time to play value 114, the optional expiry date and time value 116, and the animation code 124. The animation code 124 (e.g. API animation code 124) comprises playing instructions 126 which enable the playing of the picture fragment sets $122_1$, $122_2$, $122_3$ ... $122_x$ in a sequence one after another, wherein each picture fragment set $122_1$, $122_2$, $122_3$ ... $122_x$ would be played such that their respective selected picture frames $120_1$, $120_2$, $120_3$ ... $120_x$ are individually displayed one after another in a repeatable manner during a predetermined time period (e.g., one second periods). In addition, the animation code 124 comprises stopping instructions 128 which when executed stop the playing of the picture fragments sets $122_1$, $122_2$, $122_3$ ... $122_x$. Furthermore, the animation code 124 may comprise password verifying instructions 130 which when executed request a password 112' (from the user of the secure picture displaying device 104) and verifies the received password 112' to the stored password 112 before implementing the playing instructions 126. If desired, the animation code 124 may comprise: (1) decrementing instructions 132 which when executed reduce the time to play value 114 within the secure picture executable file 108 by a predetermined amount when a predetermined amount of time has passed during which the playing instructions 126 are being implemented; and (2) deleting instructions 134 which when the time to play value 114 has been completely decremented function to delete the picture fragment sets $122_1$, $122_2$, $122_3$ ... $122_x$ within the secure picture executable file 108. The animation code 124 may also comprise deleting instructions 136 which when executed keep track of the current date and time and upon reaching the expiry date and time value 116 functions to delete the picture fragment sets $122_1$, $122_2$, $122_3$ ... $122_x$ within the secure picture executable file 108.

In the outputting operation 218b, the secure picture generating device 102 outputs the secure picture executable file 108 (see FIG. 2B's outputting operation 218b). In general, the secure picture generating device 102 outputs the secure picture executable file 108 to the secure picture displaying device 104. It should be appreciated that the secure picture generating device 102 and the secure picture displaying device 104 would normally be separate and distinct devices but they could also be if desired the same device.

Figure 3B:
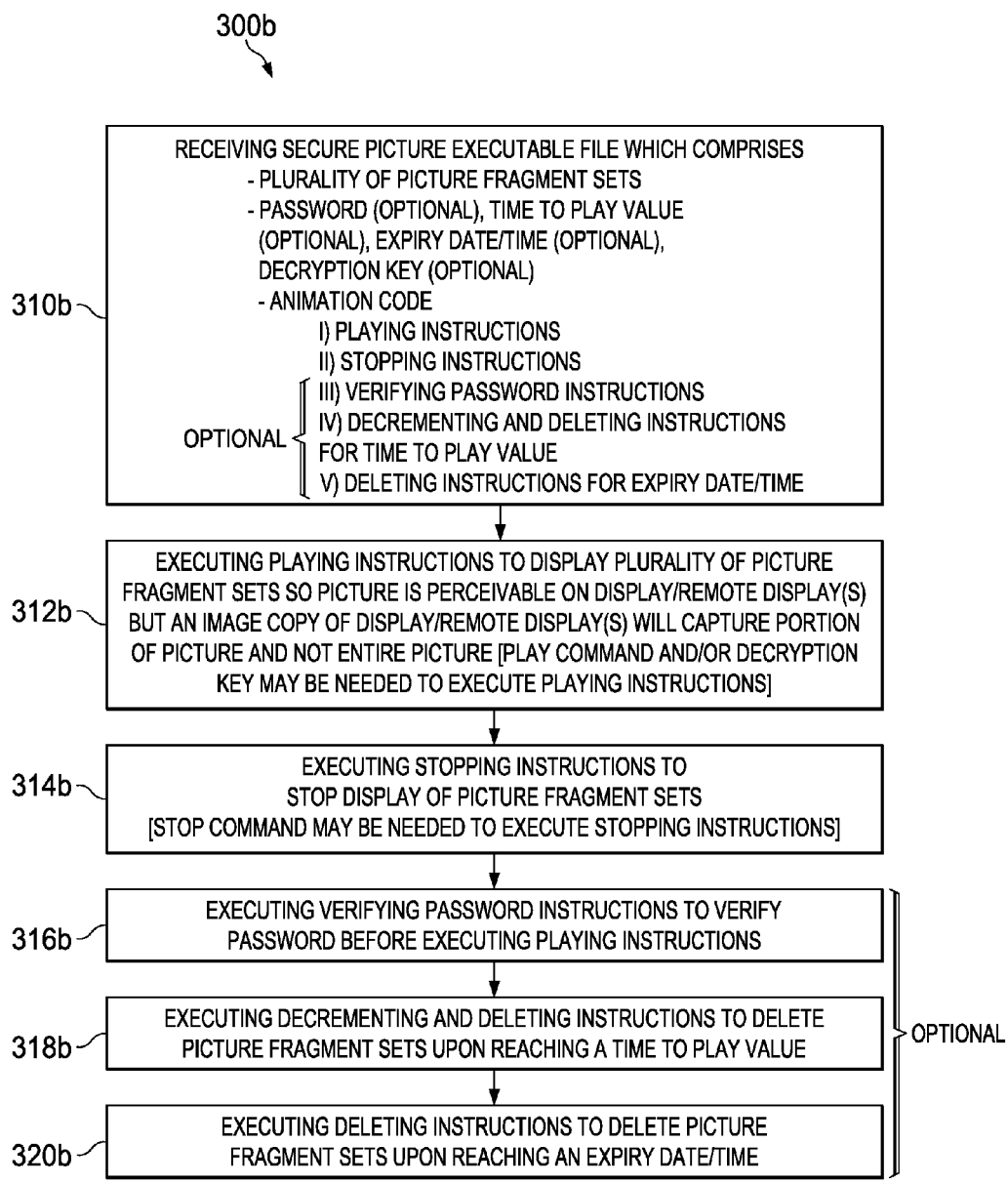

Referring to FIGS. 3A-3B, there are respectively illustrated a diagram of an exemplary secure picture displaying device 104 and a flowchart of a method 300b implemented by the secure picture displaying device 104 for displaying the picture 106 in a secure manner in accordance with an embodiment of the present invention. As shown in FIG. 3A, the secure picture displaying device 104 comprises an input interface 302, an optional user interface 304, an optional display 110, a processor 306, a memory 308, and an optional output interface 309. The secure picture displaying device 104 may incorporate many other well-known components but for clarity only those components 302, 304, 110, 306, and 308 which are needed to describe the features of the present invention are discussed and shown herein.

The secure picture displaying device 104 comprises the processor 306 which interfaces with the memory 308 and executes processor-executable instructions stored therein to enable a receiving operation 310b, a playing operation 312b, an optional stopping operation 314b, an optional password verification operation 316b, optional time to play value decrementing and picture fragment sets deleting operations 318b, and optional expiry date checking and picture fragment sets deleting operations 320b (see FIG. 3B' method 300b).

In the receiving operation 310b, the secure picture displaying device 104 receives the secure picture executable file 108 (see FIG. 3B's receiving operation 310b). As discussed above, the secure picture displaying device 104 receives the secure picture executable file 108 from the secure picture generating device 102. The secure picture executable file 108 comprises the plurality of picture fragment sets $122_1$, $122_2$, $122_3$ ... $122_x$, the optional password 112, the optional time to play value 114, the optional expiry date and time value 116, and the animation code 124. The animation code 124 (e.g. API animation code 124) comprises playing instructions 126 which enable the playing of the picture fragment sets $122_1$, $122_2$, $122_3$ ... $122_x$ in a sequence one after another wherein each picture fragment set $122_1$, $122_2$, $122_3$ ... $122_x$ would be played such that their respective selected picture frames $120_1$, $120_2$, $120_3$ ... $120_x$ are individually displayed one after another in a repeatable manner during a predetermined time period (e.g., one second periods). In addition, the animation code 124 comprises stopping instructions 128 which when executed stop the playing of the picture fragments sets $122_1$, $122_2$, $122_3$ ... $122_x$. Furthermore, the animation code 124 may comprise password verifying instructions 130 which when executed request a password 112' (from the user of the secure picture displaying device 104) and verifies the received password 112' to the stored password 112 before implementing the playing instructions 126. If desired, the animation code 124 may comprise: (1) decrementing instructions 132 which when executed reduce the time to play value 114 within the secure picture executable file 108 by a predetermined amount when a predetermined amount of time has passed during which the playing instructions 126 are being implemented; and (2) deleting instructions 134 which when the time to play value 114 has been completely decremented function to delete the picture fragment sets $122_1$, $122_2$, $122_3$ ... $122_x$ within the secure picture executable file 108. The animation code 124 may also comprise deleting instructions 136 which when executed keep track of the current date and time and upon reaching the expiry date and time value 116 functions to delete the picture fragment sets $122_1$, $122_2$, $122_3$ ... $122_x$ within the secure picture executable file 108.

In the playing operation 312b, the secure picture displaying device 104 executes the playing instructions 126 such that the picture 106 is perceivable to the human eye on the display 110/remote display(s) 110 but an image copy of the display 110/remote display(s) 110 at any given time will capture the displayed selected picture frame $120_4$ (for example) but will not capture the entire picture 106 (see FIG. 3B's playing operation 312b) (note: the output interface 309 would be used to enable the display/animation of the picture 106 at the remote display(s) 110). In one example, the secure picture displaying device 104 would receive the play command 126' (if required in the first place) from the user via the user interface 304 (or input interface 302) and then execute the playing instructions 126 to play the picture fragment sets $122_1$, $122_2$, $122_3$ ... $122_x$ in a sequence one after another, wherein each picture fragment set $122_1$, $122_2$, $122_3$ ... $122_x$ would be played such that their respective selected picture frames $120_1$, $120_2$, $120_3$ ... $120_x$ are individually displayed one after another in a repeatable manner during a predetermined time period (e.g., one second periods) (note: the user can directly interface with the secure picture displaying device 104 or they can use their own device (which would have a remote display 110) to interface with the secure picture displaying device 104). In the illustrated example, the secure picture displaying device 104 would execute the playing instructions 126 and repeatedly play the selected picture frames $120_1$, $120_2$ and $122_3$ from the first picture fragment set $122_1$ over a predetermined time (e.g., one second) and then repeatedly play the second selected picture frames $120_4$, $120_5$ and $120_6$ from second picture fragment set $122_2$ over a predetermined time (e.g., one second). Hence, the first picture fragment set $122_1$ would be played for a predetermined time (e.g., one second), then the second picture fragment set $122_2$ would be played for a predetermined time (e.g., one second) and then the first picture fragment set $122_1$ would be played for a predetermined time (e.g., one second) and so on. If one attempted to copy the displayed picture 106 through a browser function or a screen snap shot then the resulting image copy would only contain the displayed selected picture frame $120_2$ (for example) and more importantly not contain the entire picture 106.

In the stopping operation 314b, the secure picture displaying device 104 executes the stopping instructions 128 to stop the displaying or animation of the picture 106 (see FIG. 3B's stopping operation 314b). In one example, the secure picture displaying device 104 would receive the stop command 128' (if required in the first place) from the user via the user interface 304 (or the input interface 302) and then execute the stopping instructions 128 to stop of the displaying of picture fragments sets $122_1$, $122_2$, $122_3$ ... $122g$.

In the password verification operation 316b (optional), the secure picture displaying device 104 executes the verifying instructions 130 to request a password 112' (from the user of the secure picture displaying device 104) and verifies the received password 112' to the stored password 112 before implementing the playing instructions 126 (see FIG. 3B's password verification operation 316b). Typically, the verification operation 316b would only be performed if the secure picture executable file 108 has the password 112 stored therein. In other words, the secure picture executable file 108 would not have the verifying instructions 130 in the first place if there was no password 112.

In the time to play value decrementing and picture fragment sets deleting operations 318b (optional), the secure picture displaying device 104 executes: (1) the decrementing instructions 132 to reduce the time to play value 114 within the secure picture executable file 108 by a predetermined amount when a predetermined amount of time has passed during which the playing instructions 126 are being implemented; and (2) the deleting instructions 134 to delete the picture fragment sets $122_1$, $122_2$, $122_3$ ... $122_x$ within the secure picture executable file 108 when the time to play value 114 has been completely decremented (see FIG. 3B's decrementing-deleting operation 318*b*). Typically, the secure picture executable file 108 would not have the determining instructions 132 and the deleting instructions 134 in the first place if there was no time to play value 114.

In the expiry date checking and picture fragment sets deleting operations 320*b* (optional), the secure picture displaying device 104 executes deleting instructions 136 to keep track of the current date and time and upon reaching the expiry date and time value 116 deletes the picture fragment sets $122_1$, $122_2$, $122_3$ ... $122_x$ within the secure picture executable file 108. Typically, the secure picture executable file 108 would not have the deleting instructions 136 in the first place if there was no expiry date and time value 116.

In view of the foregoing description, one skilled in the art will readily appreciate that the present invention is a marked improvement over the state-of-the-art since (1) the disclosed secure picture generating device 102 and corresponding method 200*b* relate to receiving of a picture 106 and then generating a secure picture executable file 108 which functions to secure the picture 106 when it is displayed such as being posted to an online social media site or elsewhere on the Internet, and (2) the disclosed secure picture displaying device 104 (which has a display 110 and/or is connected to remote display(s) 110) and corresponding method 300*b* relate to receiving the secure picture executable file 108 and then executing the secure picture executable file 108 to display a selected portion of the picture at any one time on the display 110/remote display(s) 110 such that the picture 106 is perceivable by the human eye but an image copy of the display 110/remote display(s) 110 will capture the displayed selected portion of the picture 106 but will not capture the entire picture 106. Basically, the secure picture system 100 described herein not only provides a password protected encrypted picture 106, and means to securely display the picture 106, but it also defeats simple screen snap shots, and even camera pictures of the display screen which is displaying (animating) the picture 106.

It should be noted that although the description provided herein described securing a picture that is displayed-posted to an online social media site or elsewhere on the Internet it should be appreciated that the secure picture generating device 102 and the secure picture displaying device 104 can be used to secure a picture that is displayed in any manner and not limited to only securing a picture that is displayed-posted to an online social media site or elsewhere on the Internet.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A secure picture generating device for securing a picture, the secure picture generating device comprising:
   a processor; and
   a memory that stores processor-executable instructions where the processor interfaces with the memory and executes the processor-executable instructions to enable following operations:
   receiving the picture;
   segmenting the picture into a plurality of picture frames;
   creating a plurality of picture fragment sets, wherein each picture fragment set comprises picture frames selected from the plurality of picture frames and the selected picture frames when taken together collectively represent the picture;
   generating a secure picture executable file which comprises:
      the plurality of picture fragment sets; and
      animation code comprising playing instructions for playing the plurality of picture fragment sets in sequence one after another, where when each picture fragment set is played, the selected picture frames are individually displayed sequentially in a repeatable manner during a predetermined time period, and wherein the animation code further comprises:
         decrementing instructions for reducing a time to play value within the secure picture executable file by a predetermined amount when a predetermined amount of time has passed during which the playing instructions are being implemented, and
         deleting instructions for deleting the plurality fragment sets within the secure picture executable file when the time to play value has been completely decremented; and
   outputting the secure picture executable file.

2. The secure picture generating device of claim 1, wherein the animation code further comprises stopping instructions for stopping the playing of the plurality of picture fragments sets.

3. The secure picture generating device of claim 1, wherein the animation code further comprises verifying instructions for requesting a password and verifying the password before implementing the playing instructions.

4. The secure picture generating device of claim 1, wherein the animation code further comprises deleting instructions for deleting the plurality of picture fragment sets within the secure picture executable file upon reaching an expiry date.

5. The secure picture generating device of claim 1, wherein the secure picture executable file further comprises at least one of following:
   a password;
   an expiry date/time; and
   an encryption type.

6. A method implemented by a secure picture generating device for securing a picture, the method comprising:
   receiving the picture;
   segmenting the picture into a plurality of picture frames;
   creating a plurality of picture fragment sets, wherein each picture fragment set comprises picture frames selected from the plurality of picture frames and the selected picture frames when taken together collectively represent the picture generating a secure picture executable file which comprises:
      the plurality of picture fragment sets; and
      animation code comprising playing instructions for playing the plurality of picture fragment sets in sequence one after another, wherein when each picture fragment set is played, the selected picture frames are individually displayed sequentially in a repeatable manner during a predetermined time period, and wherein the animation code further comprises:
         decrementing instructions for reducing a time to play value within the secure picture executable file by a predetermined amount when a predetermined amount of time has passed during which the playing instructions are being implemented, and deleting instructions for deleting the plurality of fragment sets within the secure picture executable file when the time to play value has been completely decremented; and outputting the secure picture executable file.

7. The method of claim 6, wherein the animation code further comprises stopping instructions for stopping the playing of the plurality of picture fragments sets.

8. The method of claim 6, wherein the animation code further comprises verifying instructions for requesting a password and verifying the password before implementing the playing instructions.

9. The method of claim 6, wherein the animation code further comprises deleting instructions for deleting the plurality of picture fragment sets within the secure picture executable file upon reaching an expiry date.

10. The method of claim 6, wherein the secure picture executable file further comprises at least one of following:

a password;

an expiry date/time; and an encryption type.

11. A secure picture displaying device for displaying a picture on a display, the secure picture displaying device comprising:

a processor; and a memory that stores processor-executable instructions where the processor interfaces with the memory and executes the processor-executable instructions to enable following operations:

receiving a secure picture executable file which comprises:

a plurality of picture fragment sets, wherein each picture fragment set comprises picture frames selected from a plurality of picture frames, where each picture frame is a segment of the picture, and where the selected picture frames when taken together collectively represent the picture; and animation code comprising playing instructions for playing the plurality of picture fragment sets in sequence one after another, wherein when each picture fragment set is played, the selected picture frames are individually displayed sequentially in a repeatable manner during a predetermined time period, and wherein the animation code further comprises decrementing instructions for reducing a time to play value within the secure picture executable file by a predetermined amount when a predetermined amount of time has passed during which the playing instructions are being implemented, and deleting instructions for deleting the plurality of fragment sets within the secure picture executable file when the time to play value has been completely decremented; and executing the playing instructions whereby the picture is perceivable on the display but an image copy of the display at any given time will capture the displayed selected picture frame but will not capture the picture.

12. The secure picture displaying device of claim 11, wherein the processor executes the processor-executable instructions to enable following operations:

receiving a play command; and executing, in response to receiving the play command, the playing instructions.

13. The secure picture displaying device of claim 11, wherein the processor executes the processor-executable instructions to enable following operations:

receiving a stop command; and executing, in response to receiving the stop command, stopping instructions in the animation code for stopping the playing of the plurality of picture fragments sets.

14. The secure picture displaying device of claim 11, wherein the processor executes the processor-executable instructions to enable following operations:

receiving a password; and executing verifying instructions in the animation code to verify the password before executing the playing instructions.

15. The secure picture displaying device of claim 11, wherein the processor executes the processor-executable instructions to enable following operation: executing deleting instructions for deleting the plurality of picture fragment sets within the secure picture executable file upon reaching an expiry date.

16. A method implemented by a secure picture displaying device for displaying a picture on a display, the method comprising:

receiving a secure picture executable file which comprises:

a plurality of picture fragment sets, wherein each picture fragment set comprises picture frames selected from a plurality of picture frames, where each picture frame is a segment of the picture, and where the selected picture frames when taken together collectively represent the picture; and animation code comprising playing instructions for playing the plurality of picture fragment sets in sequence one after another, wherein when each picture fragment set is played, the selected picture frames are individually displayed sequentially in a repeatable manner during a predetermined time period, and wherein the animation code further comprises decrementing instructions for reducing a time to play value within the secure picture executable file by a predetermined amount when a predetermined amount of time has passed during which the playing instructions are being implemented, and deleting instructions for deleting the plurality of fragment sets within the secure picture executable file when the time to play value has been completely decremented; and executing the playing instructions whereby the picture is perceivable on the display but an image copy of the display at any given time will capture the displayed selected picture frame but will not capture the picture.

17. The method of claim 16, wherein the executing operation further comprises:

receiving a play command; and executing, in response to receiving the play command, the playing instructions.

18. The method of claim 16, wherein the executing operation further comprises:

receiving a stop command; and executing, in response to receiving the stop command, stopping instructions in the animation code for stopping the playing of the plurality of picture fragments sets.

19. The method of claim 16, wherein the executing operation further comprises:

receiving a password; and executing verifying instructions in the animation code to verify the password before executing the playing instructions.

20. The method of claim 16, wherein the executing operation further comprises executing deleting instructions for deleting the plurality of picture fragment sets within the secure picture executable file upon reaching an expiry date.

* * * * *

UNITED STATES PATENT AND TRADEMARK OFFICE
CERTIFICATE OF CORRECTION

| | | |
|---|---|---|
| PATENT NO. | : 9,058,839 B1 | Page 1 of 1 |
| APPLICATION NO. | : 14/109371 | |
| DATED | : June 16, 2015 | |
| INVENTOR(S) | : Corriveau | |

It is certified that error appears in the above-identified patent and that said Letters Patent is hereby corrected as shown below:

On the title page, under "OTHER PUBLICATIONS", in Column 1, Lines 9-11, delete "http://www.ohgjzmo.com/2014/10/17ivovo-photo-sharing-app-messes-screenshots:protect-pics/." and insert -- http://www.ohgizmo.com/2014/10/17/vovo-photo-sharing-app-messes-screenshots-protect-pics/. --, therefor.

In the specification

In Column 10, Line 48, delete "$122_1, 122_2, 122_3...122_g.$" and insert -- $122_1, 122_2, 122_3...122_x.$ --, therefor.

Signed and Sealed this
Twenty-fourth Day of November, 2015

Michelle K. Lee
*Director of the United States Patent and Trademark Office*